March 24, 1936.  W. F. HOELZER  2,034,811
RESILIENT TIRE
Filed Feb. 1, 1935
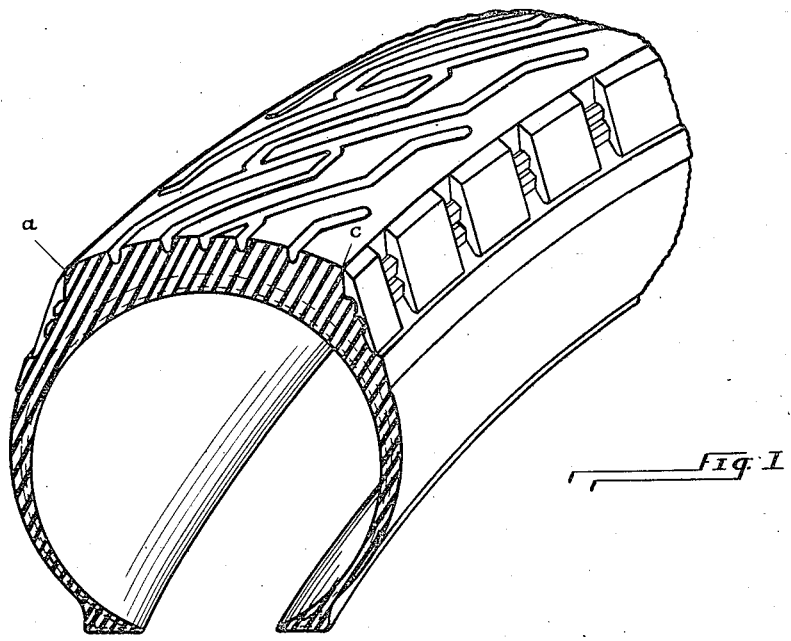
Fig. I
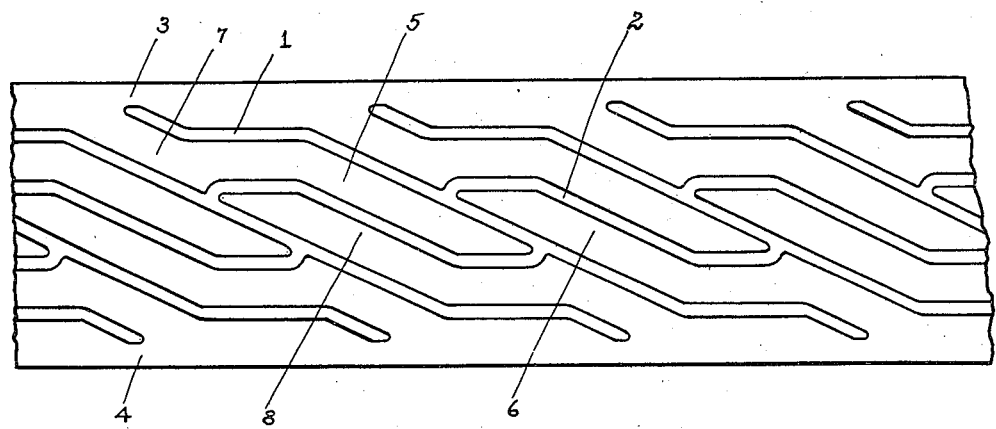
Fig. II
INVENTOR
William F. Hoelzer
by Christy and Wharton
his attorneys Patented Mar. 24, 1936

2,034,811

UNITED STATES PATENT OFFICE 2,034,811

RESILIENT TIRE

William F. Hoelzer, Greensburg, Pa., assignor to Pennsylvania Rubber Company, a corporation of Pennsylvania Application February 1, 1935, Serial No. 4,508

2 Claims. (Cl. 152—14)

This invention relates to vehicle tires of resilient material, ordinarily of that rubber composition in general use and as a matter of convenience termed rubber; and consists in a tread configuration such as to afford skid-preventing properties combined with noiselessness, and at the same time affording a tire that is in highest degree durable. While I shall show and describe the invention in application to the shoe of the familiar pneumatic automobile tire, it will be manifest that it is applicable to vehicle tires generally formed of resilient material.

In the accompanying drawing Fig. I is a fragmentary view in perspective of a tire in whose tread configuration my invention is embodied; Fig. II is a plan view of the tread projected in a single plane.

The tread configuration is formed by grooves or channels of uniform cross-section that extend in particular pattern upon the tread of the tire. The tread itself is slightly arched transversely, as is usual, and as appears in Fig. I of the drawing. In the particular tire shown the tread surface, from a to c, Fig. I, may be understood to be a little more than four inches wide on horizontal line, and of somewhat greater width when measured along the curve of the transverse arch. The grooves are in this instance .336 of an inch deep, round-bottomed and slightly flaring outwardly. The curvature of the round bottom is in this case on a radius of .070 of an inch, and the width of the groove at its rim is .200 of an inch.

Referring to Fig. II of the drawing, and selecting for consideration the groove 1, and considering it in its left to right extent, it will be perceived that it begins near one margin of the tread (the upper margin as here illustrated) .350 of an inch from the margin. At its end it widens and deepens from a rounded point to the full dimensions given; it then extends first obliquely, then longitudinally, then obliquely across the centre line of the tread, then longitudinally again, then obliquely and terminates as it began. On the two sides of the centre line of the tire the two halves of the groove lie in relatively reversed positions, but otherwise the two halves are alike and are symmetrically disposed with respect to the centre line. The angularity of the obliquely-extending portions of the groove is slightly less than 30°, with respect to the centre line of the tread.

Like grooves succeed one another at intervals of 3.690 inches, around the circumference of the tire. The grooves in their circumferential extent around the tire are more than twice as long as the interval at which they succeed one another. The succeeding grooves are interconnected by a second succession of grooves, the grooves 2. These extend across the centre line of the tread obliquely and medially between the adjacent grooves 1, and, turned at their two ends to longitudinal direction, each unites with the two adjacent grooves 1. All the obliquely-extending portions of the grooves are uniform in obliquity, and accordingly parallel.

By such an arrangement of grooves a succession of protrusions is formed, embossed upon the tread of the tire. At its margin there are continuous circumferentially-extending areas 3, 4 of the ungrooved higher level. From these marginal areas extend fingers whose outer surfaces extend on the same ungrooved higher level. These are the fingers 5, 6. They are divided and defined by the grooves described. Each finger, springing from the marginal area, extends first obliquely inward, then longitudinally, and then obliquely again, across the centre line of the tread, and terminates in a tapered, round-tipped point. With the minor modifications shown, these fingers are of uniform width. They spring almost oppositely from the two margins, extend in opposite directions, and the two opposite sets of fingers interdigitate across the centre line of the tread. The obliquely-extending basal portion 7 of each finger on one side is exactly aligned with the obliquely-extending distal portion 8 of a finger extending from the opposite side.

From these structural features certain functional characteristics follow. The grooves with their abrupt rims (approximating a right angle in cross-section) are an effective skid-preventing feature; they act with squeege effect, in penetrating any liquid skim or coating upon the road surface, and engaging the underlying solid surface; by virtue of their diversified directions of extent (longitudinal in part and oblique in part) they are adapted as a skid-preventing feature more effectively to oppose the variously directed stresses that tend to cause a car to skid. Their multiplicity increases their effectiveness. Because they are the rims of relatively narrow grooves that divide relatively broad protrusions, they endure as a skid-preventing feature; the tire wears away slowly, and they persist as it wears away. Because the succeeding, obliquely-extending grooves lie in overlapped succession, on every succeeding transverse line the car has a virtually uniform area of contact with the ground. This makes for smoothness of travel, and durability of the tires.

Because the grooves are long and terminate at the margins of the tread, the tires are noiseless in service. The interval at which the grooves 1, 2 succeed one another around the circumference of the tire, commonly termed the pitch space, is very much less than (actually less than half of) the length of the grooves, and less than the length of the fingers formed and defined by the grooves; in consequence, there is no jumping from protrusion to protrusion, no consequent tendency to bumping, and uncompromised durability. There is no continuous band in the centre portion of the tread, nor any continuous circumferential groove. If the extent of any groove be followed, it will be perceived that its progress in one direction is interrupted by a recession in opposite direction; and in consequence it becomes possible to form the tread of denser stock than otherwise would be possible, without danger of splitting, and so to build a tire of greater inherent wearing quality.

I claim as my invention:

1. A noiseless, non-skid, resilient, vehicle tire, whose tread surface is by means of grooves provided with an embossed configuration consisting of two sets of elongate, parallel-sided protrusions, including each a basal portion that extends obliquely from the margin of the tread inwardly, a medial portion that extends longitudinally of the tread, and a distal portion that extends obliquely upon the tread, the protrusions of the two sets being so placed that the distal portion of a protrusion that extends from one margin is aligned with the basal portion of a protrusion that extends from the opposite margin, and the distal portions of the two sets lie in interdigitated positions upon the tread of the tire.

2. A noiseless, non-skid, resilient, vehicle tire that bears embossed upon its tread surface a succession of identical protrusions, defined by grooves that extend in continuity from side to side of the tire, the protrusions being elongate, parallel-sided, and all of equal length and breadth, arranged in parallelism and in two sets extending obliquely from the margins and interdigitated in the median portion of the tread, the pitch space of the arranged protrusions being less than the circumferential extent of the individual protrusion.

WILLIAM F. HOELZER.